United States Patent [19]

Nakahata

[11] 4,254,432
[45] Mar. 3, 1981

[54] PURITY DETECTION APPARATUS FOR COLOR PICTURE TUBES

[75] Inventor: Kozo Nakahata, Yokohama, Japan

[73] Assignee: Hitachi, Ltd., Japan

[21] Appl. No.: 872,578

[22] Filed: Jan. 26, 1978

[30] Foreign Application Priority Data

May 23, 1977 [JP] Japan .................................. 52-58772

[51] Int. Cl.³ .............................................. H04N 9/62
[52] U.S. Cl. .................................................... 358/10
[58] Field of Search ...................... 358/10; 324/20 CR;
315/13 C, 368

[56] References Cited

U.S. PATENT DOCUMENTS

| | | | |
|---|---|---|---|
| 3,723,801 | 3/1973 | Oxentiam | 315/13 C |
| 3,737,716 | 6/1973 | Gerntsen | 315/13 C |
| 3,748,526 | 7/1973 | Wedam | 315/13 C X |
| 3,916,437 | 10/1975 | Barbin | 358/10 |
| 4,001,877 | 1/1977 | Simpson | 358/10 |
| 4,035,834 | 7/1977 | Drury | 358/10 |
| 4,095,137 | 6/1978 | Oswald | 315/368 X |
| 4,159,484 | 6/1979 | Strathman | 358/10 |

*Primary Examiner*—Raymond F. Cardillo, Jr.
*Assistant Examiner*—Aristotelis M. Psitos
*Attorney, Agent, or Firm*—Craig & Antonelli

[57] ABSTRACT

A raster, for example in magenta, generated on a phosphor screen of a color picture tube is picked up by a television camera through an optical filter which allows a magenta component to pass therethrough predominantly. The television camera scans the displayed raster in the horizontal direction on the line base thereby to produce a video signal representing luminances at individual points on the raster lines. A sample and hold circuit is provided to extract paired video signal values at paired points on the raster lines located symmetrically to each other relative to a vertical center line of the display screen. One of the paired video signal values extracted through the timed sampling operation is subtracted from the other at a processing circuit.

9 Claims, 6 Drawing Figures

PURITY DETECTION APPARATUS FOR COLOR PICTURE TUBES

The present invention relates to a purity detecting apparatus for a color picture tube having an in-line type electron gun assembly.

In a color picture tube having three electron guns, electron beams emitted from the associated electron guns will not properly impinge on the phosphur dots of the phosphor screen if the electron beams do not pass through the center of deflection (center of exposition) predetermined at the time of manufacturing the color picture tube. Since various errors will occur in the course of manufacturing the color picture tube, it has been proposed that the three electron beams can be simultaneously displaced through rotation of rotatable magnet rings thereby to make the center of deflection of the electron beams coincide with the center of exposition, as disclosed in U.S. Pat. No. 3,725,831. Such adjustment is generally referred to as the purity adjustment which is carried out in the manner described below.

When a monochromatic raster signal is supplied to a color picture tube with the deflection yoke being displaced from the center of deflection in the axial direction of the picture tube, a color belt 1 will be produced on the screen, as shown in FIG. 1 of the accompanying drawings. Starting from this state, the purity adjusting magnets mounted at the neck portion of the color picture tube are rotated thereby to make the vertical center line of the color belt 1 coincide with the vertical center line of the phosphor screen. When such coincidence has been attained, the electron beams will impinge accurately on the respective phosphor dots at the center and its vicinity of the display screen. This adjustment may thus be referred to as the central purity adjustment. Subsequently, the deflection yoke is displaced along the axis of the picture tube so that the whole display screen be in the same monochromatic color as the central portion. When the identical monochromatic light is emitted from the phosphor screen over its whole area, the electron beams are considered to impinge correctly on the associated phosphor dots even at the peripheral portions. This adjustment is referred to as the peripheral purity adjustment.

Since the hitherto known purity adjustment is carried out through eyesight observation, non-uniformity in the purity adjustments and degradation in the adjusting accuracy will inevitably occur. Besides, the purity adjustment requires time consuming labor. In particular, the color belt 1 does not usually make an appearance in the form of a belt having a uniform width as indicated by broken line 2 in FIG. 1. Further, boundary lines of the color belt 1 becomes rather indefinite. Thus, it is difficult to bring the vertical center line of the color belt 1 into coincidence with the vertical center line of the phosphor screen. Besides, the eyesight observation will bring about undesirable eyestrain.

An object of the invention is to provide a purity detecting apparatus for a color picture tube having an in-line type electron gun assembly, which apparatus assures a rapid detection of purity of color picture tubes.

Another object of the invention is to provide a purity detecting apparatus which is capable of detecting purity of color picture tubes with a high accuracy.

Still another object of the invention is to provide a purity detecting apparatus which can be advantageously used with an automatic purity adjusting apparatus for color picture tubes.

According to one aspect of the invention, there is provided a purity detecting apparatus for a color picture tube having an in-line type electron gun assembly, which apparatus comprises raster generating means for supplying to the color picture tube having beam deflection adjusting means a display signal which generates a raster of a uniform color over the whole display screen of a color picture tube which is assumed to have been properly adjusted. An optical filter allows the component of the uniform color to pass therethrough predominantly while suppressing the other components, and pick-up means are provided for picking up the raster through the optical filter by scanning the display screen of the color picture tube on the line base in the horizontal direction and on the frame base in the vertical direction. Thus is produced a video signal which is representative of luminance at individual picture elements. Sampling means are also provided for sampling the video signal to extract signal values at predetermined points on the screen, along with means for processing the extracted signal values thereby to output results of the processing.

The invention will be more readily understood from the following detailed description illustrated by the accompanying drawings, in which.

Figure 2:
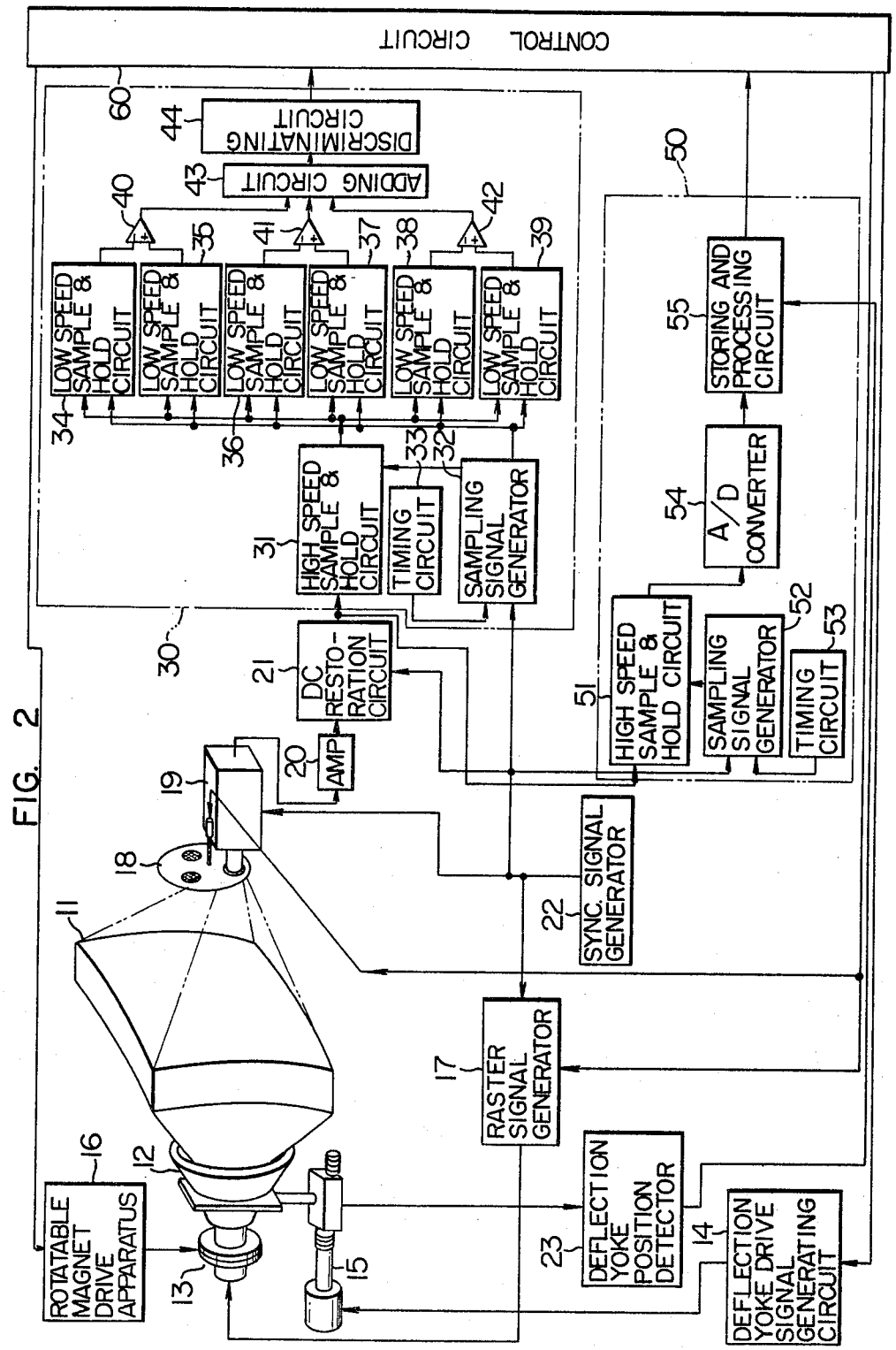
FIG. 2 is a circuit diagram showing an arrangement of an automatic purity adjusting apparatus for a color picture tube in which a purity detection apparatus according to an embodiment of the invention is employed.

Referring to FIG. 2 which shows in a block diagram an automatic purity adjustment apparatus for a color picture tube incorporating therein a purity detection apparatus constructed according to an embodiment of the invention, a color picture tube 11 with an in-line type electron gun assembly has a deflection coil 12 and a rotatable magnet 13 mounted at its neck portion for deflection of the beam. Initially, the beam deflection coil 12 as well as the rotatable magnet 13 are disposed movably so as to allow the adjustment of purity and convergence to be carried out. After the desired purity and convergence characteristics have been attained through corresponding displacement of the beam deflection coil 12 and the rotatable magnet 13, they are secured to the tube 11. In the following, description will be made in detail on the automatic adjustment of purity.

The deflection coil or yoke 12 is adapted to be moved in the axial direction of the picture tube by means of a deflection yoke drive apparatus 15 which is controlled by a driving signal derived from a deflection yoke drive signal generating circuit 14. On the other hand, the rotatable magnet 13 is rotated around the center axis of the picture tube by a driving signal from a rotatable magnet drive apparatus 16, thereby to displace an in-line array of three electron beams in the same direction. Since the drive signal generating circuit 14 and the magnet drive apparatus 16 are controlled by the control signal from a control circuit 60, the displacements of the deflection yoke 12 and the rotatable magnet 13 are ultimately controlled by the control signal from the control circuit 60. This control circuit may be any desired system such as a microprocessor or a computer programmed to perform sequential control operations such as will be discussed hereinafter.

The color picture tube 11 has a display screen on which a raster is produced by a display signal from a raster signal generator 17. In the case of a color picture tube which has been properly adjusted or conditioned, the color of the raster will be magenta for the central purity adjustment of the display screen, while red and blue colors are used for the peripheral purity adjustment. The change-over among these three kinds of colors is effected by the control signal from the control circuit 60. In synchronism with the change-over or switching of colors, an optical filter 18 is controlled so as to change-over the transmission colors thereof. When the raster is in magenta, red and blue, the optical filter 18 allows the magenta component (i.e., the red and blue components), red component and blue component to pass therethrough, respectively. A television camera 19 serves to line-scan the display screen of the color picture tube 11 through the optical filter 18 in the transverse or horizontal direction and to frame-scan in the vertical direction, thereby to produce video signals representative of luminance of the filtered color components as emitted from individual picture elements of the raster produced on the screen of the picture tube 11. The video signal thus produced is amplified through an amplifier 20 and subsequently DC-restored through a DC restoration circuit 21 so as to have a constant potential level corresponding to the pedestal portion or the black level of the video signal. The DC restored video signal is then supplied to a high speed sample and hold circuit 31 of a central purity detection circuitry 30 and to a high speed sample and hold circuit 51 of a peripheral purity detection circuitry 50. A synchronizing signal generator 22 is provided to generate a synchronizing signal which is supplied to both the raster signal generator 17 and the television camera 19 to synchronize the horizontal synchronization of the raster signal from the raster signal generator 17 with the horizontal synchronization of the video signal from the television camera 19 with a view to stabilizing the video signal. Otherwise, there would appear, in the video signal, variations having a period corresponding to the difference between the two horizontal synchronization described above. The synchronizing signal from the generator 22 is slightly delayed in the DC restoration circuit 21 to be utilized as a pedestal clamping pulse. Further, the synchronizing signal is supplied to a sampling signal generator 32 of the central purity detection circuitry 30 and to a sampling signal generator 52 of the peripheral purity detection circuitry 52 as a reference signal for sampling the video signal.

For the central purity adjustment or the adjustment of purity at the central portion of the screen, a raster in magenta is generated on the display screen of the color picture tube 11 with the deflection yoke 12 being in a state in which the center of deflection of the yoke 12 is considerably displaced along the axis of the picture tube from the center of exposition of the screen panel of the picture tube. Through displacement of the center of deflection and the center of exposition relative to each other in the axial direction of the picture tube, purity of display produced on the screen at right and left peripheral or side portions thereof will be remarkably degraded. For example, when the deflection yoke 12 is displaced so as to approach the funnel portion of the picture tube thereby to locate the center of deflection of the deflection yoke 12 nearer to the display screen than the center of exposition, the phosphor dots positioned laterally adjacent to the phosphor dots which are to be intrinsically irradiated with electron beams will tend to emit light with higher luminance, as such phosphor dots are located farther leftward or rightward from the vertical center line of the display screen. Consequently, in the case of the color picture tube in which electron guns for red, green and blue are sequentially arrayed in this order from the right of the display screen as viewed from the front side of the picture tube while phosphor dots are repeatedly arrayed in the order of blue, green and then red from the right, the color at the center portion of the display screen will be magenta, while the colors at right and left peripheral or side portions will be yellow and cyanic, respectively. Upon coincidence between the center of deflection and the center of exposition in respect of horizontal positions thereof, a vertical strip in magenta will appear at the center portion of the display screen.

Figure 1:
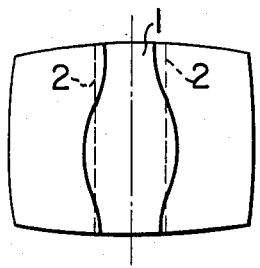
FIG. 1 shows schematically a display screen of a color picture tube having a vertical color belt.
Figure 3:
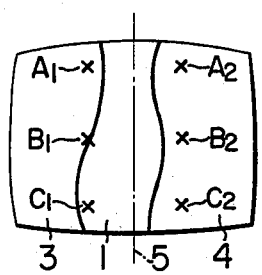
FIG. 3 shows locations of detection points on a display screen of a color picture tube for the central purity adjustment.
Figure 4:
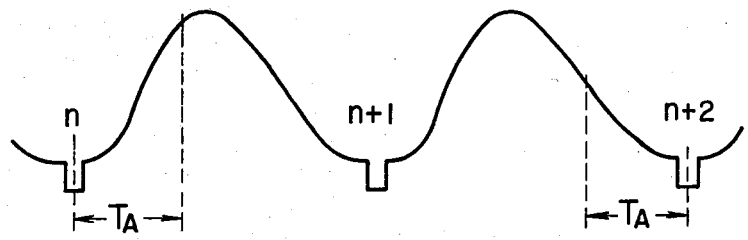
FIG. 4 shows graphically the voltage waveform of a video signal obtained by horizontally line-scanning the screen shown in FIG. 3 through a television camera.

For the displacement of the deflection yoke 12 toward the display screen or toward the electron gun assembly in the axial direction of the color picture tube, a command signal is supplied to the deflection yoke drive signal generating circuit 14 from the control circuit 60, whereby the deflection yoke 12 will be moved in the corresponding direction through operation of the deflection yoke drive apparatus 15. A deflection yoke position detector 23 is provided to produce position information of the yoke 12 which is supplied to a storing and processing circuit 55 of the peripheral purity detection circuitry 50. After displacement of the deflection yoke 12 in the axial direction of the tube, the raster signal generator 17 supplies a signal for display in magenta to the color picture tube 11 in response to the control signal from the control circuit 60 and the optical filter 18 is then set for transmission of the magenta component therethrough predominantly. Under these conditions, the displayed color pattern will be such as shown in FIG. 3 in which colors at the left hand portion, central portion and the right hand portion of the screen are cyanic, magenta and yellow, respectively. When the colored display is scanned in the horizontal direction through the optical filter 18 as set as above described by means of the television camera 19 on the line base, a video signal such as shown in FIG. 4 can be obtained. Since the optical filter 18 which is set so as to permit the magenta component to pass therethrough predominantly will suppress the cyanic and yellow components, the peak value of the video signal will be located almost at the intermediate or middle position between two successive horizontal synchronizing signals.

A detection timing circuit 33 is provided to establish sampling time points at which signal values are to be sampled from the video signal such as shown in FIG. 4 at predetermined time points. More particularly, the detection timing circuit 33 is used to determine the sequence of the line durations in which each of the sampling time points for the video signal shown in FIG. 4 is included, and additionally determines the time interval from the beginning of the line duration to the sampling time point, whereby the luminance or light intensity of magenta at predetermined positions of the produced display can be detected. To this end, the sampling signal generator 32 may include a counter for counting the synchronizing signals from the synchronizing signal generator 22. The sampling signal for sampling the video signal at the sampling time points determined by the detection timing circuit 32 is supplied to the high speed sample and hold circuit 31 as well as to the low speed sample and hold circuits 34, 35, 36, 37, 38 and 39. The high speed sample and hold circuit 31 exhibits an enhanced response characteristic with a relatively short hold time duration, while the low speed sample and hold circuits 34 to 39 provide a relatively long holding time duration with somewhat degraded response characteristics. By virtue of the combination of both types of the sample and hold circuits as illustrated in the drawing, it is possible to process a plurality of sampled values smoothly. As detection points for detecting purity at the central portion of the produced display, six detection points A1, A2, B1, B2, C1, and C2 are selected in such an array as shown in FIG. 3. It can be seen from this figure that the detection points A1, B1 and C1 are positioned symmetrically to the detection points A2, B2 and C2, respectively, relative to a vertical center line 5. When the luminances of magenta at the symmetrical points A1 and A2, B1 and B2, and C1 and C2 become, respectively, equal to each other, it is determined that the position of the center of deflection in the horizontal direction coincides with the position of the center of exposition in the same direction. The displacement of the center of deflection is also effected through rotation of the rotatable magnet 13 which in turn is controlled by the magnet drive apparatus 16 adapted to be controlled by the control signal from the control circuit 60.

It is assumed that the color picture tube 11 and the television camera 19 are so set that the time center point between the successive horizontal synchronizing signals may coincide with the horizontal center of the displayed raster shown in FIG. 3. Under the condition, when the video signal value at the detection point A1 appears after time duration $T_A$ has elapsed from the n-th horizontal synchronizing signal, then the video signal value at the detection point A2 will make an appearance at a time point which precedes to the (n+2)-th horizontal synchronizing signal for the time interval $T_A$. In the case of the illustrated embodiment, the television camera 19 is adapted to scan the produced raster display from left to right on the line base and vertically downwardly on the frame base, as viewed in FIG. 3. Accordingly, the high speed sample and hold circuit 31 will sample the video signal in the order of A1, A2, B1, B2, C1 and C2, while the sampled or extracted video signal values are sequentially held by the low speed sample and hold circuits 34 to 39, respectively. A subtraction circuit 40 is provided to subtract the signal value derived from the detection point A1 from the signal value at the detection point A2. In a similar manner, the signal value obtained from the detection point B1 is subtracted from the signal value at the detection point B2 by a subtraction circuit 41, while the signal value at the detection point C1 is subtracted from the signal value obtained from the detection point C2 by a subtraction circuit 42. The difference signals output from the subtraction circuits 40, 41 and 42 are added together at an adding circuit 43. A sum signal resulted therefrom is supplied to a discriminating circuit 44 which is destined to determine whether the sum signal is zero or lies within an acceptable predetermined range in the vicinity of zero. The output signal from the discriminating circuit 44 is applied to the control circuit 60 which causes the rotatable magnet 13 to be continuously rotated until the discrimination signal indicates that the sum signal is within the acceptable predetermined range in the vicinity of zero. With the sum signal within the predetermined range, the rotation of the magnet 13 is stopped.

The locations of the detection points A1, A2, B1, B2, C1 and C2 should be determined in consideration of the fact that the output signal of the television camera 19 is sometimes afflicted with shading. In this connection, the detection points A1, B1 and C1 should be preferably arrayed somewhat deviated from the symmetrical positions of the detection points A2, B2 and C2, respectively, relative to the vertical center line 5 (refer to FIG. 3). Upon addition of the difference signals described above, it is preferred that these difference signals be weighted in dependence on the locations of the associated detection points in the vertical direction prior to the addition.

After the completion of the central purity adjustment of the display screen as described above, the peripheral purity adjustment is carried out in order to place the deflection coil 12 at a desired position on the axis of the picture tube. To this end, many detection points are selected on the peripheral or side portions of the phosphor screen. As the deflection yoke 12 is moved along the axis of the picture tube in a stepwise manner, luminances at the detection points are stored for every position of the deflection coil along the axis of the picture tube. A region of the deflection yoke positions is determined in which luminances of intensity higher than a predetermined level are produced. Additionally, a deflection yoke position common to all the detection points is determined and the deflection yoke 12 is finally set to the common position.

More particularly, display signal for red is supplied to the color picture tube under the control of the control circuit 60. The optical filter 18 is set so as to allow the red component to pass predominantly therethrough. Under these conditions, the position of the deflection yoke 12 is sequentially changed. At every position of the deflection yoke 12 along the axis of the picture tube, video signals obtained at the detection points D1, D2, ..., D24 are supplied to the storing and processing circuit 55 through a high speed sample and hold circuit 51 and A/D converter 54. The storing and processing circuit 55 serves to store the signal values at all the detection points for every step of movement of the deflection coil or yoke 12 along the axis of the picture tube. The high speed sample and hold circuit 51, a sampling signal generator 52 and a detection timing generator 53 may be identical with the high speed sample and hold circuit 31, the sampling signal generator 32 and the detection timing circuit 33 described hereinbefore in conjunction with the central purity adjustment of the screen.

Figure 5:
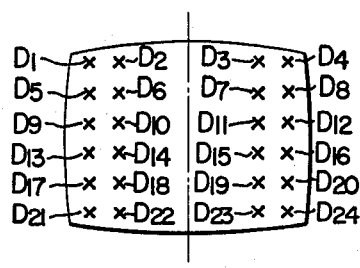
FIG. 5 shows locations of detection points on the display screen for the peripheral purity adjustment.
Figure 6:
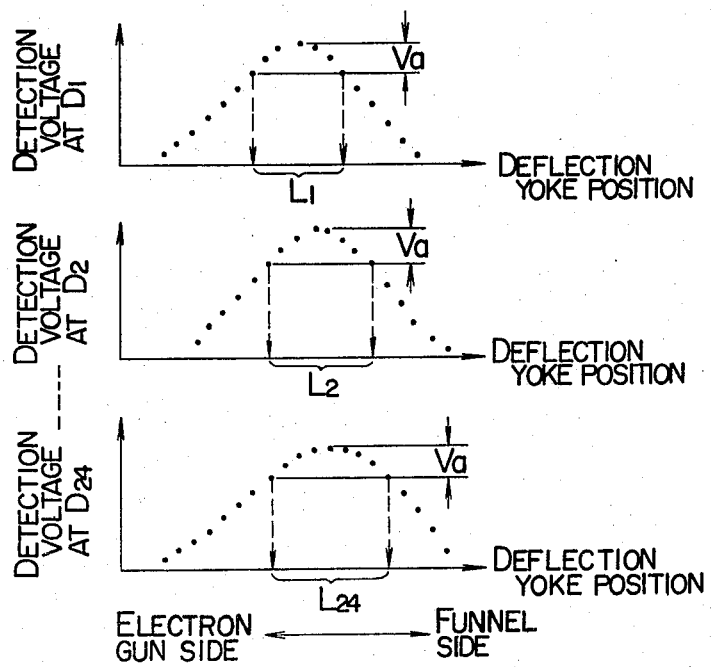
FIG. 6 is a waveform diagram of voltage signals obtained at the detection points shown in FIG. 5 as a function of displacement of a deflection yoke in the axial direction of the picture tube.

FIG. 6 illustrates signal values at the detection points as shown in FIG. 5 which vary as a function of the sequentially changing positions of the deflection yoke. Although only the signal voltage profiles for the detection points D1, D2 and D24 are shown in FIG. 6, it will be appreciated that similar signal voltages are obtained also at the other detection points D3–D23. As can be seen from FIG. 6 there is a maximum voltage at each detection point which occurs when the deflection yoke is in a certain position. The signal voltage level becomes lower, as the deflection yoke 12 is positioned at each of the detection points away from the particular position which yielded the maximum voltage at that detection point either nearer to the electron gun assembly or the display screen along the axis of the color picture tube. Obviously, color purity is best at any particular detection point when the detection voltage is at its peak value. However, since the peak values at the detection points generally correspond to different axial positions of the yoke, such as can be seen in FIG. 6, an allowable level of detection voltage which yields acceptable purity is established for each detection point at a voltage $V_a$ less than the peak voltage. Then, for each of the detection points D1 and D24, ranges of positions $L_1, L_2, \ldots, L_{24}$ of the deflection yoke 12 where the detection voltage value is higher than the allowable level can be determined by the storing and processing circuit 55. Additionally, a region $L_R$ which is common to all the ranges $L_1, L_2, \ldots, L_{24}$ can be determined. Such determinations of the ranges $L_1, L_2 \ldots _{24}$ and $L_R$ can be readily accomplished by using a microprocessor programmed in a known manner to compare the individually obtained detection voltages with the allowable voltage level for each particular detection point.

Next, detection of the peripheral purity for blue is effected. To this end, the raster signal generator 17 generates a blue display signal under the control of the control circuit 60, while the optical filter 18 is set so that the blue component can predominantly pass therethrough. In a similar manner as the purity detection for red, a region $L_B$ common to all the ranges in which the signal values higher than the predetermined allowable level can be obtained at the detection points D1 to D4 is determined. Finally, another region or range $L_O$ which is common to the ranges $L_R$ and $L_B$ is determined, and the deflection yoke 12 is placed at a position within the range $L_O$ by the deflection yoke driving apparatus 15.

According to the method described above, the purity adjustment has been made for each of the side electron beams for red and blue. Thus, it is unnecessary to perform the purity adjustment for the center electron beam for green. The allowable level of the signal voltages obtained at the detection points D1 and D24 may be made different from one another by weighting differently the signal voltages in accordance with the locations of the detection points. Additionally, it is preferred that the allowable level at the position of the deflection yoke nearer to the electron gun assembly be different from the corresponding level at the deflection yoke position nearer to the funnel portion of the color picture tube.

What is claimed is:

1. An apparatus for detecting color purity of a color picture tube having an in-line type electron gun assembly, comprising:
    raster generating means for supplying to the color picture tube having beam deflection adjusting means a display signal which generates a raster of a uniform color over the whole display screen of a color picture tube which is assumed to have been properly adjusted;
    an optical filter for allowing the component of said uniform color to pass therethrough predominantly while suppressing the other components;
    pick-up means for picking up said raster through said optical filter by scanning the display screen of said color picture tube on a line base in the horizontal direction and on a frame base in the vertical direction, thereby to produce a video signal representative of luminance at picture elements of said raster;
    sampling means for sampling said video signal thereby to extract signal values at predetermined points on said screen; and
    detection means for comparing said extracted signal values with predetermined values and for generating a detection signal when said extracted signal values are identical with said predetermined values to thereby indicate color purity.

2. An apparatus as set forth in claim 1, further comprising a reference synchronizing signal generator means for supplying a reference synchronizing signal to said raster generating means and said pick-up means for synchronizing horizontal synchronization of said display signal from said raster generating means with horizontal synchronization of said video signal from said pick-up means.

3. An apparatus as set forth in claim 1, wherein said sampling means comprises timing means for designating time points at which said video signal is sampled, and holding means for holding video signal values extracted through samplings at said designated time points.

4. An apparatus as set forth in claim 2, wherein said sampling means comprises timing means for designating time points at which said video signal is sampled, and holding means for holding video signal values extracted through sampling at said designated time points, said timing means including a counter for counting said reference synchronizing signals from said reference synchronizing signal generating means, thereby to establish time intervals each beginning with count of said reference synchronizing signal corresponding to a predetermined value and extended to said time point at which said video signal is sampled.

5. An apparatus as set forth in claim 3, wherein said timing means is adapted to designate time points at which paired signal values derived at paired points on said raster located symmetrically to each other relative to a vertical centerline of said display screen appear in said video signal, and wherein said detection means is adapted to subtract one of said paired signal value from the other and to generate said detection signal when the subtraction result is zero or within a predetermined range about zero.

6. An apparatus as set forth in claim 5, wherein said beam deflection adjusting means includes a rotatable magnet mounted around a neck portion of said color picture tube, and the purity detecting apparatus further includes rotating means for rotating said rotatable magnet upon a tube axis and stopping means for stopping the rotation of said purity magnet when said detection signal is supplied thereto.

7. An apparatus for detecting color purity of a color picture tube having an in-line type electron gun assembly and a deflection yoke mounted around a portion of said color picture tube, comprising:
    raster generating means for supplying to the color picture tube having beam deflection adjusting means a display signal which generates a raster of a uniform color over the whole display screen of a color picture tube which is assumed to have been properly adjusted;

an optical filter for allowing the component of said uniform color to pass therethrough predominantly while suppressing the other components;

pick-up means for picking up said raster through said optical filter by scanning the display screen of said color picture tube on a line base in the horizontal direction and on a frame base in the vertical direction, thereby to produce a video signal representative of luminance at picture elements of said raster;

sampling means for sampling said video signal thereby to extract signal values at predetermined points on said screen;

deflection yoke moving means for displacing said deflection yoke to a plurality of different positions in the axial direction of said color picture tube; and storing means for storing said sampled signal values at predetermined points on said raster for each of said plurality of different positions of said deflection yoke as indications of color purity at said predetermined points.

8. An apparatus as set forth in claim 7, further comprising processing means for determining a deflection yoke position at which all sampled signal values are larger than a predetermined signal value and setting means for displacing said deflection yoke to said determined deflection yoke position.

9. An apparatus for detecting color purity of a color picture tube having an in-line type electron gun assembly comprising:

raster generating means for supplying to a color picture tube the purity of which is to be measured a display signal which generates a uniform raster of a predetermined color over the whole display screen of a well qualified color picture tube the color purity of which has been properly adjusted;

an optical filter for allowing one component color of said predetermined color to pass therethrough predominantly while suppressing the other components;

pick-up means for scanning a display screen of said color picture tube under detection through said filter so as to produce a video signal representative of luminance of the raster of said component color at respective points on the screen;

sampling means for sampling said video signal so as to extract sampled signals at predetermined points on said screen; and detection means for comparing said sampled signals with standard signals which are predetermined for the respective points on the screen so as to generate a detection signal when said sampled signals are identical with said standard signals to thereby indicate color purity.

* * * * *